United States Patent
Stolpen

[15] 3,670,427
[45] June 20, 1972

[54] LANGUAGE TEACHING APPARATUS AND METHOD

[72] Inventor: Beulah Harris Stolpen, 282 North Ave., Westport, Conn. 06880

[22] Filed: Feb. 17, 1971

[21] Appl. No.: 116,042

Related U.S. Application Data

[63] Continuation-in-part of Ser. No. 774,949, Nov. 12, 1968, abandoned.

[52] U.S. Cl. .................................................35/35 J, 35/71
[51] Int. Cl. .........................................................G09b 1/34
[58] Field of Search............................................35/35 J, 71

[56] References Cited

UNITED STATES PATENTS

| | | |
|---|---|---|
| 1,286,631 | 12/1918 | Hillyard....................................35/71 |
| 1,542,031 | 6/1925 | Bruhn.......................................35/71 |
| 2,987,833 | 6/1961 | Stolpen.....................................35/71 |
| 3,235,976 | 2/1966 | Elliott et al.............................35/35 J |
| 3,389,480 | 6/1968 | Holland...................................35/35 J |
| 3,422,549 | 1/1969 | Grangaard................................35/71 |

FOREIGN PATENTS OR APPLICATIONS

| | | |
|---|---|---|
| 622,219 | 6/1961 | Canada......................................35/71 |
| 1,281,020 | 11/1961 | France....................................35/35 J |

*Primary Examiner*—Wm. H. Grieb
*Attorney*—E. Barron Batchelder

[57] ABSTRACT

Apparatus and method for teaching the system of language, its sounds and structure, including a plurality of structured, multi-faceted or facially incremented units, bearing on at least one surface or increment indicia representative of a pattern element comprising functional labels of the parts of speech, a morpheme element comprising semantic and syntactic factors of the language, a phonogram element comprising letters and combinations of letters, a phonemic alphabet and corresponding graphemes, each element being cross-referenced and interrelated to another element; and structured exercises, structured cards, structured games, and structured audio-devices cross-referenced to elements of the multifaceted units.

14 Claims, 22 Drawing Figures

PATENTED JUN 20 1972 3,670,427

INVENTOR
BEULAH H. STOLPEN

BY E. B. Batchelder

ATTORNEY

INVENTOR
BEULAH H. STOLPEN

Mary invited me to a party and said to bring something very nice.
John brought a _____
Sid brought a _____
Katey brought a _____
I brought the nicest thing. I brought you.

INVENTOR
BEULAH H. STOLPEN

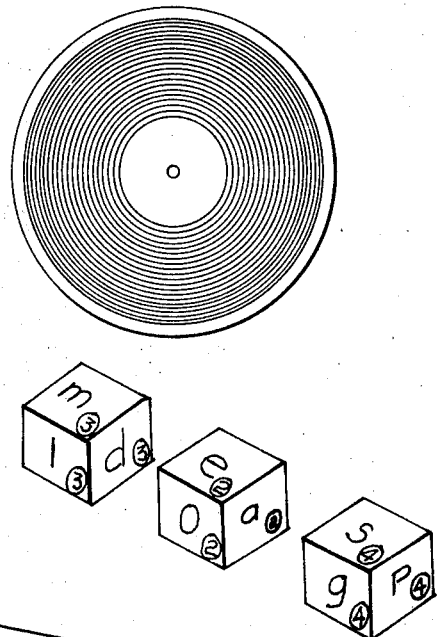

Johnny has a little animal he calls Og. Find O on [2] and g on [4]. When I stop, you roll [3] and put the letter that turns up in front of the animals name and sound the word. Count how many times you have to roll it to discover what kind of an animal it is. Stop. No, it's not a log or a mog or a fog. It's a hog or a dog.

Did you get it right? How many chances did you take?

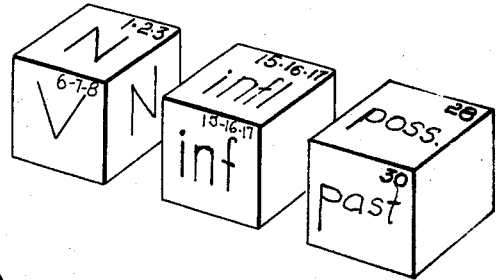

N + infl ⟹ possessive boy + 's ⟹ boy's

V + infl ⟹ 3rd pers. sing.

fight + ed ⟹ fought

N + deriv ⟹ adjective friend + ly ⟹ friendly

V + deriv ⟹ noun fight + er ⟹ fighter

FIG. 19

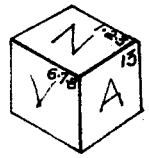 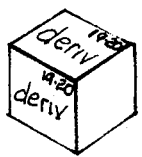 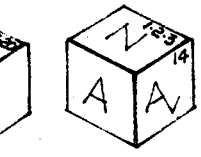

INVENTOR
BEULAH H. STOLPEN

LANGUAGE TEACHING APPARATUS AND METHOD

This is a continuation-in-part of co-pending application serial number 774,949, filed Nov. 12, 1968, now abandoned, and titled: AN IMPROVED TEACHING DEVICE.

BACKGROUND OF THE INVENTION

Language is comprised of a fascinating and intricate complex of patterns controlling the sounds and forms of words and of sentences. These patterns are held together about a systematic core of patterns, the grammar of the language.

The spelling of the sounds and the understanding of the structure of the phonemic, morphemic, and syntactical patterns are the building blocks of language. It is, therefore, appropriate that language-bearing, three-dimensional, manipulative elements constitute the foundation for a device providing a fundamental insight into language, and which are susceptible of being combined with other structured elements to strengthen the foundation.

Language is a system into which the rules fit in a significant and revealing way. Language instruction which is to educate must show clearly this systematic nature, the interrelatedness of the parts and something of the complexity of the whole. To understand the structure of the language on more than a superficial level, it is necessary to understand the interdisciplinary relationships.

Grammar becomes trivial when its systematic organization is destroyed. Language, basically, is a system or a complex of systems. Bits and pieces cannot be taught or omitted at will simply because they are individually judged useful or not. As items are dropped, the system falls apart. When certain parts are eliminated, it becomes more difficult to teach the remainder. The more connected the facts, the easier they are to teach.

In this context, the overall purpose of this invention is to make of the user an intelligent observer of language and involve him actively by providing tools that will be revealing, entertaining, and appeal to the sense of touch, of sound, and of sight; to reshape teacher attitudes, so that teachers who are willing to make the effort can attain a working familiarity with the "new grammar" by self-education; and to help remove linguistics from the realm of the esoteric.

By the utilization of the invention and the data presented, the observer will be led to an understanding of the underlying concepts from which he can make his own deductions concerning the structure of language, thus developing an appreciation of the marvelous intricacy of human language.

It is a significant object of the invention to revitalize the teaching of grammar, stimulate an interest in the subject amongst students and laymen by providing means that create an atmosphere of understanding through play, and possibly help reverse the deterioration in grammar teaching that has gone on for the past two or three generations.

A sentence is made up of parts, which, in turn, are made up of parts, and so on, until the ultimate indivisible pieces are reached. There are different levels of structure. One level should be described at a time and then, with interaction with another element, be constructed into the next level as it builds into a larger construction.

A variety of devices and equipment have heretofore been utilized for educational activities in the teaching of traditional grammar and other isolated language arts areas. Recent linguistic studies have shown a need for apparatus and method that would more clearly show the patterns of language and the interrelationships of the parts to the whole.

By allowing choices which can be explicitly presented, it is possible for a reasonable set of rules to lead to the very large number of sentences known to exist in the English language. Appropriate adjusting of the patterns to accommodate the structure of other languages will serve as a paradigm from which to draw readily observable similarities and differences between different languages.

New teachings in grammar tend to confuse some students when they are confronted with abstract definitions and symbols that involve concepts, such as: $d + A + N + V + \text{infl} + A_f + PP = S$. By the utilization of tools, such as provided in this invention, the user can inductively construct the problem, and deductively draw conclusions. By cross-referencing and interrelating multi-faceted units bearing morphemic equivalents, the symbology takes on semantic significance and the relevancy of the concept is readily understood for application in other situations.

It is then apparent that $d$ for determiner, $+A$ for adjective, N for noun, V for verb, infl. for syntax, $A_f$ for adverb, and PP for prepositional phrase, can be transposed to read: "My young sister flys often to get there.", or any semantics equivalent in syntactic structure.

Though free morpheme elements are cross-referenced with sentence pattern elements for simplicity of understanding sentence pattern symbols, it will be clear to the observer that traditional designations of noun, verb, adjective, or adverb are not applied to the morphemic units. These form classes can only be so designated by their positioning in the sentence and by the action of function words or structure parts upon them. For example: Ship the block, or block the ship.

The relationship between language and mathematics will become more apparent as linguistic equations and structures are created. $A + \text{Deriv.} = N$, or sweet $+$ ness $=$ sweetness.

SUMMARY OF THE INVENTION

The object of this invention over my prior U.S. Pat. No. 2,987,833 and other prior art is to more fully elucidate the system of language by structuring phonetic, graphemic, morphemic, and grammatical elements on manipulatable indicia-bearing multi-faceted or facially incremented units, interrelating them with each other and with "working elements" such as structured exercises, structured cards, structured games, or structured audio-devices, so that the whole, the sentences, can be analyzed in terms of its parts, the morphemes, graphemes, and phonemes of which language is composed, or the parts can be constructed into the whole by the application of one rule after another.

The grammatical structure elements contain indicia or symbols representing the grammar of the language. Though there is variation in the terminology of linguists, this invention utilizes symbology as consistent with the generally accepted terms as possible, and add logically meaningful symbology where needed. All sentences are composed of a subject and a predicate; therefore, the linguistic equation for a sentence would be $NP + VP = S$. A structuring of a multi-faceted unit containing on its surfaces N (for noun), P (for pronoun), one containing V (for verb), and be (for "to be"), and a third unit containing N, A (adjective), and $A_f$ (adverb) can produce the basic patterns from which all sentences are generated. A random cast of units will always produce the pattern of a sentence.

While all units in each pattern element may be colored the same, deviation from this premise would not alter the spirit of the invention. Different elements may be colored differently for ease of rapid identification or all elements can be colored the same. This, too, is not an essential consideration of the invention. One or a plurality of surfaces of each unit of the elements contain indicia relevant to a pattern element and indicia cross-referencing it with the units of another pattern of or with a working element such as: structured exercises, structured cards, structured games, or structured audio-devices. The working elements contain indicia cross-referencing them with the manipulative pattern element units and with other working elements. Other and further objects and advantages of the invention will be more readily apparent from the following detailed description of embodiments thereof, when taken together with the accompanied drawings in which:

FIG. 1 is a perspective view of a series of units bearing indicia in the nature of grammatical symbols constituting a sentence pattern unit as may be used in accordance with the invention;

FIG. 2 is a view similar to FIG. 1 of a modified set of pattern units in accordance with the invention;

FIG. 3 is a perspective view of a plurality of Morpheme element units cross-referenced with the grammatical symbol units of FIG. 1;

FIG. 4 is a perspective view of a plurality of Morpheme element units cross-referenced with grammatical symbol units of FIGS. 1 and 2;

FIG. 4A shows application of the invention similar to FIG. 4 in a foreign language.

FIG. 5 is a perspective view of a grammatical symbol pattern unit and corresponding Morphemes in another form of the invention;

FIG. 5A is a perspective view of two units having a different geometric configuration but employing the concept of the invention;

FIG. 6 is a plan view of a modified form of the invention utilizing surfaces containing incremental delineations analogous to multiple facet type units;

FIG. 7 is a perspective view of a still further modification of a unit form in accordance with the invention;

FIGS. 8, 9 and 10 are plan representations of structural exercises and perspective views of inter-related Morpheme element units constituting a further form of the invention;

FIG. 11 is a plan view of a game and interrelated perspective of a Morpheme element units constituting an additional form of the invention;

FIG. 12 is a plan view of cards interrelated with Morpheme elements and showing in perspective interrelated Morphemic phonogram and phonetic elements in an additional form of the invention;

FIG. 13 is a view similar to the subject of FIG. 12 showing a further modified form of the invention;

FIG. 14 is a perspective view of a series of phonogram element units cross-referenced with phonetic element units as shown in FIG. 15;

FIG. 15 is a perspective view of phonetic element units cross-referenced with the phonogram elements shown in FIG. 14;

FIG. 15A shows the units bearing indicia of the International phonetic alphabet with diacrytical markings.

FIG. 16 is a perspective view which depicts multi-faceted Morpheme element units interrelated with, in a plan, a structured exercise and a record interrelated with a multi-faceted element;

FIG. 17 is a perspective view of a multi-faceted Grapheme interrelated with a structural exercise or structured audio unit;

FIG. 18 is a view similar to FIG. 5 showing a further equation including inflections for use in practicing the invention.

FIG. 19 is a view similar to FIG. 18 showing an equation including derivatives.

In order to facilitate an understanding of the invention an explanation of the symbols utilized will be helpful. The elements in FIG. 1 designate a linguistic equation denoting a noun and/or a pronoun on one unit, a verb, transitive or intransitive, and a form of "to be" on a second unit, and a noun, an adjective and an adverb on a third unit that comprise the basic formulas for the patterns of the kernel sentences from which all sentences can be abstracted and generated, since the basic patterns, which vary somewhat among current linguists, seem most acceptably to be:

1. NV (boys fight)
2. NVN (Rodger sent gifts)
3. NVA/ (Adam works too)
4. NVA (Adam seems kind)
5. NbeN (Anton is president)
6. NbeA (Anton is great)
7. NbeA (Rodger is here)

It will be obvious on examination of the drawings taken with the following, to see that every one of the above sentence patterns can be structured by manipulating units a, b, c, and that a random cast will always produce one of the above patterns using N or P interchangeably.

It will be apparent that the building blocks of language are the phonemes, (the smallest unit of sound) phonetics, and the graphemic representations of the sounds, the patterns in which phonemes and combinations of phonemes structure in different languages, the patterned but varying structures of those phonemes to form the morphemes, the meaningful units of language; the patterns within these morphemes that combine bound morphemes with free morphemes to syntactically structure the language and the patterns of sentences.

All are interrelated and cannot be divorced from the overall structure of language. Each element presents a relevant function upon which another element depends. The purpose of this invention is to present this structure in a simplified manner readily understandable to the neophyte, and provide a tool for in depth analysis for the student of linguistics.

Though cube shaped blocks have been used most frequently for purposes of convenience it is apparent that any multi-faceted unit containing indicia structured according to the tenets as outlined in this invention will achieve the same result; and the units can be made of wood, plastic, stone, or any other suitable material, and other modes of presentation can be utilized such as, for example, to film for projection and presentation on a screen.

Indicia can be applied by permanent, or removable means, to the surfaces of the units.

1. proper nouns — cross-references with 1; Adam in FIG. 3.
2. common nouns — cross-references with 2; boy in FIG. 4.
3. thing nouns — cross references with 3; box in FIG. 8.

P on unit $a$, stands for pronouns, 4 and 5 are different classes of pronouns:

4. subject pronouns — cross-reference with 4; I in FIGS. 8, 9, 10, 11.
5. object pronouns — cross-reference with 5; me — in FIGS. 8, 9, 10, 11.

Figure 4:
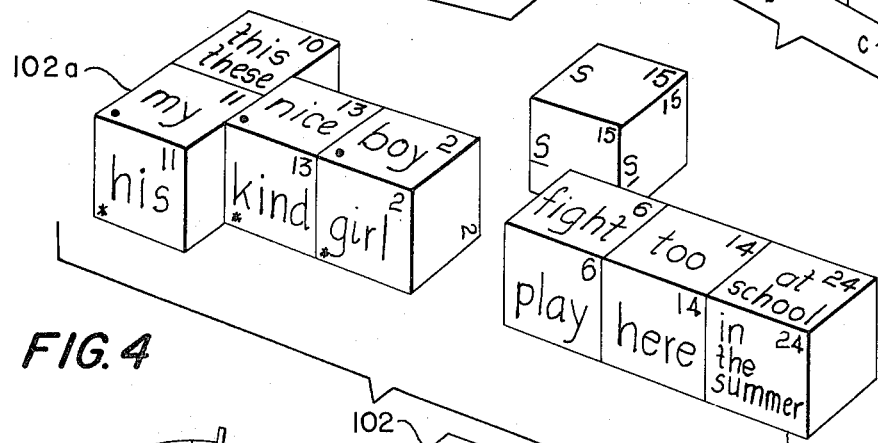
Figure 8:
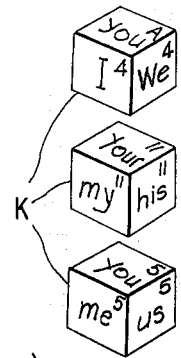
Figure 8:
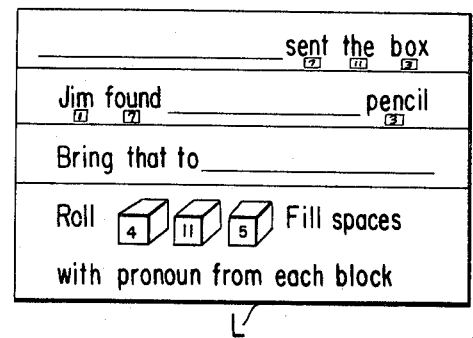

V on unit $b$, stands for Verb; 6, 7, 8 are for different classes of verbs:

6. intransitive verbs cross-reference with 6; fight in FIG. 4, 6.
7. transitive verbs cross-reference with 7; sent in FIG. 8.
8. an example of this class verb would be *seems* - as in *he seems nice*, but it does not appear in the drawings.

Figure 3:
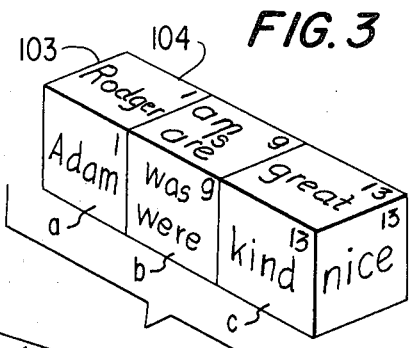

*be* on unit $b$, representing *to be*, cross-references with 9; am, is, are in FIG. 3.

Figure 5:
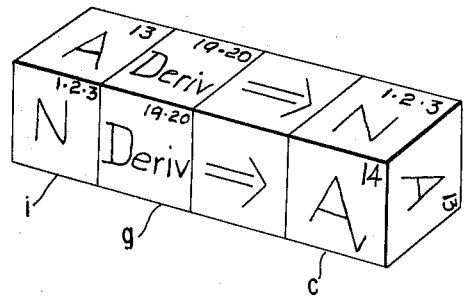
Figure 5A:
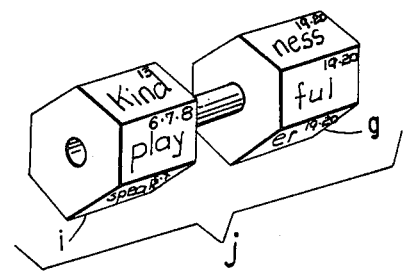

A on $c$ stands for adjective cross-referencing with 13; with *nice* in FIG. 4, with *kind* in FIG. 5A.

Figure 11:
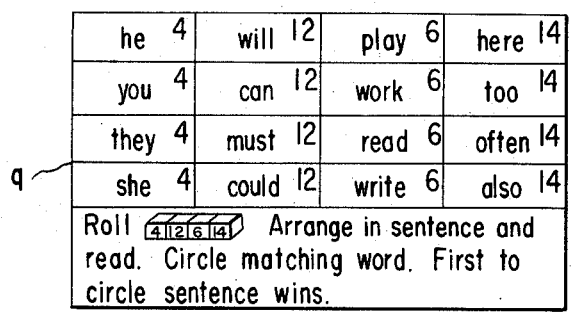
Figure 11:
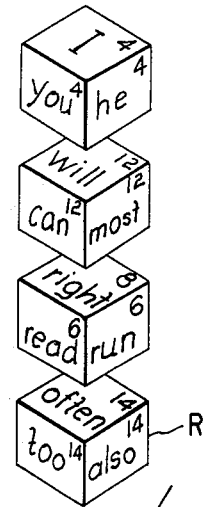

$A_f$ on $c$ stands for adverb cross-referencing with 14; too in FIG. 4, and with 14 in $q$ and R of FIG. 11.

⇒ on $d$ represents the linguistic symbol *transforms to;* S on $e$ represents a sentence.

Figure 1:
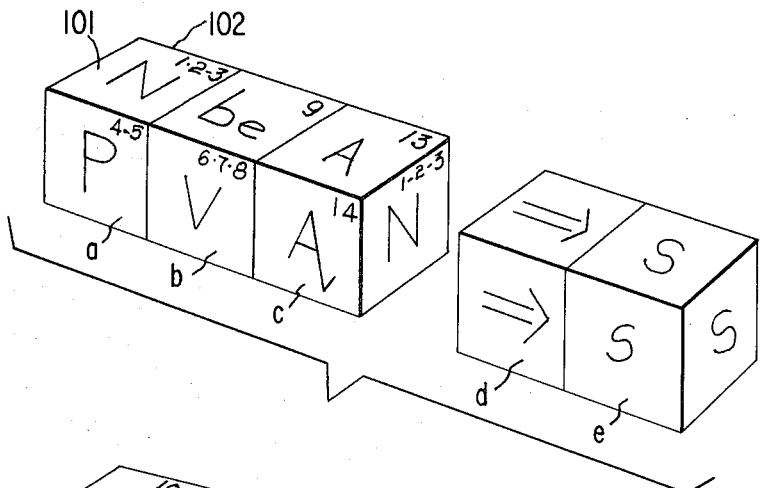
FIG. 1 shows a series of units bearing indicia 101 representing syntactical symbols of the language. 102 represents indicia for cross-referencing the indicia with other elements of the invention. On unit $a$, N stands for nouns. 1, 2, 3 indicate different classes of nouns as follows.

The top surfaces of FIG. 1 correspond to the surfaces of FIG. 3.

Figure 2:
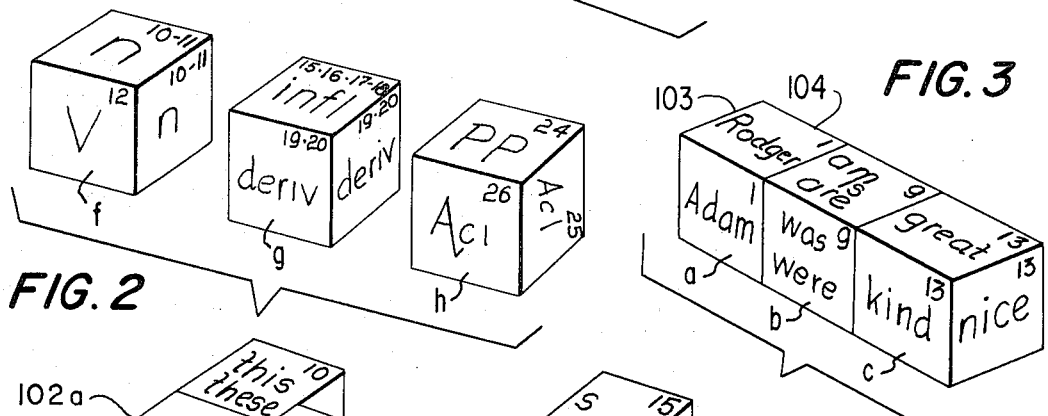

In FIG. 2, $n$ on $f$ representing a noun modifier 10 cross-references with the singular and plural articles and demonstrative pronouns as shown on unit 10 of FIG. 4. It is another feature of the invention to selectively align number and verb tense.

Figure 7:
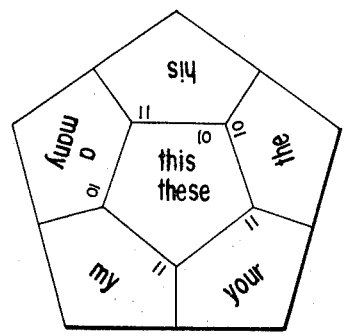

11 cross-references with possessive adjectives as shown on unit 11 in FIG. 4. 10 and 11 are shown together on one unit in FIG. 7.

Figure 10:
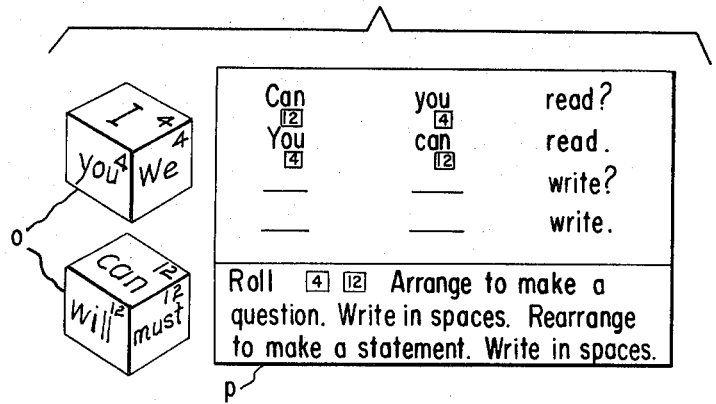

V on $f$ represents a verb modifier. 12 cross-references with the auxiliary verbs in $o$ and $p$ of FIG. 10, and $q$ and $r$ of FIG. 11.

Infl. on g represents inflection. 15 cross-references with the infl. in FIG. 4. The s can be placed after 2 (boy) if it is to be pluralized, or after 6 (fight) if 2 is to be a singular noun. It will not function in both places at the same time. This elucidates the pattern of complementary distribution in the grammar of the language. The numbers 16, 17, 18 on g stand for other inflections that interact with verbs, such as participle endings and possessives, that act on nouns.

Deriv. on g stands for derivatives. 19, affixes cross-referencing with j of FIG. 5A react on nouns, verbs and adjectives changing their form classes.

PP represents prepositional phrase and cross-references 24 with FIG. 4.

Ad. stands for adjective clause.

A d. stands for adverbial clause.

FIG. 3 shows a group of morpheme units cross-referencing with the uppermost surfaces of FIG. 1.

FIG. 4 shows a group of morpheme units cross-referencing with the uppermost surfaces of FIGS. 1 and 2 with the addition of 14 for $\overline{A/}$ on c of FIG. 1.

Figure 4A:
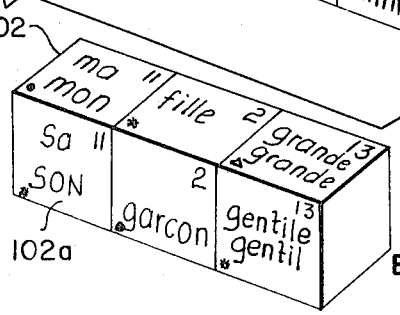

FIG. 4A, which is similar to FIG. 4, shows application of the principles of the invention to a language other than English, in this instance French, wherein gender must be taken into consideration as also transposition of adjectives and nouns.

FIG. 5 shows a linguistic pattern equation and j of FIG. 5A is another form of the invention. i in FIG. 5 contains NVA. Every derivative equation could be manipulated using these three units.

Figure 6:
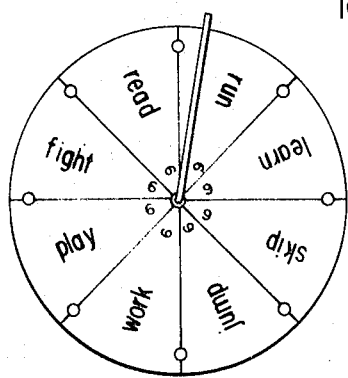

FIG. 6 is another form of the invention using a double faced spinning wheel with morphemic elements but it is clear any of the elements such as different form classes may be so employed.

FIG. 7 shows still another geometrical form of the invention.

FIG. 8 is a form of the invention coordinating a random selection of morpheme elements ($k$) cross-referenced to a structured work sheet or exercise (L). The sheets are slotted as indicated by lines to receive pronouns. Selectivity of the correct random selection units must be made.

Figure 9:
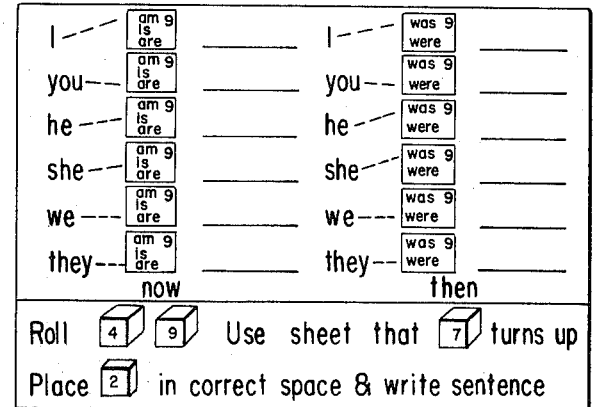
Figure 9:
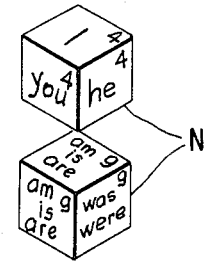

FIG. 9 is a form of the invention similar to FIG. 8. Selectivity for sheet M must be made from the surface of one of the random selection units N. This form can also be appropriately played as a game.

FIG. 10 is another form of the invention employing structured exercises and random selection units. Morpheme elements from o positioned on sheet P to first structure $\boxed{12}$ $\boxed{4}$, for a question and then the same elements are repositioned for $\boxed{4}$ $\boxed{12}$ to form a sentence.

FIG. 11 is a bingo-type game different in that separate words are randomly selected from units R and the winner must form a sentence conjointly using card or sheet $q$.

Figures 12, 13:
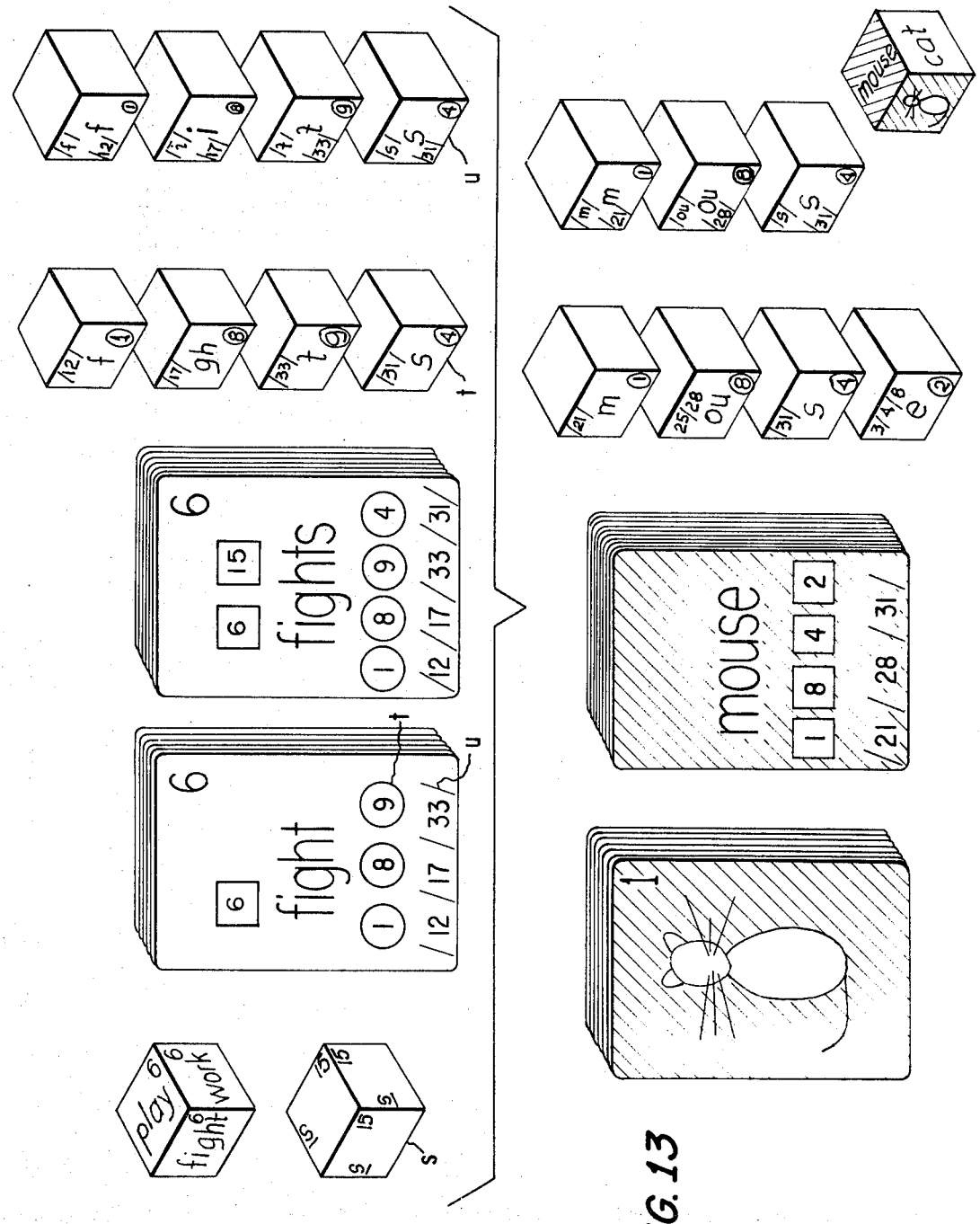

FIG. 12 is a perspective view of still another form of the invention wherein structured cards are cross-referenced to 3 elements and the cards are interrelated with morphemes as shown in FIG. 4. The number at the tops, 6 in this instance, is the morpheme element. The set contains as many units and cards as there are morphemes on the random selection. The front card shown to the left shows a singular noun or infinitive of a verb. The back shows the plural of a noun or infinitive of a verb, the third person singular of the verb. The numbers in circles represent manipulative elements of the phonogram series. The numbers in slash marks represent the elements of the phonetic series. In use, element series are selected and units manipulated to spell a word phonogrammatically using the phonogram element and/or phonemically using the phonetic element.

A somewhat similar system is shown in FIG. 13 wherein the structured cards are cross-referenced to graphemes. The cards are correlated in units of 6 co-relating with the numbers on the phonogram units. The cards are cross-referenced with the random or multi-selector unit and pictures represent the grapheme that stands for the sound heard at the beginning, in the middle or at the end of the word that says the pictures name. Members of the phonogram elements corelating with the cards being used would be randomly cast with the units. The pictures corresponding to the letter on the surface of the unit either by first, last or middle sound as indicated would be selected. The card upon reversal from front to back is used for corresponding phonogram and phonetic ele-ments in matched relationship. This form of the invention is ideally suited for use as a game.

Figure 14:
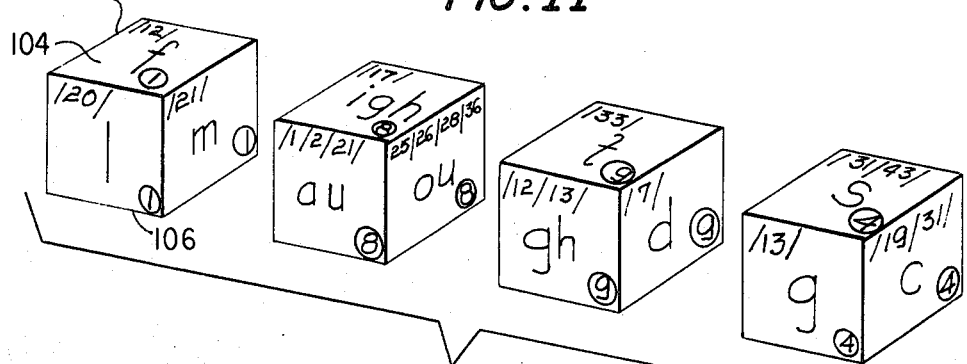

FIG. 14 shows a series of units bearing indicia (104) representing the graphemes (letters) that spell the morphemes (words); (105) indicia for cross-referencing with the phonetic elements; (106) indicia for discriminating one phonogram unit from another phonogram unit. It will be apparent that the phonogram units utilized in accordance with the cross-reference indicia selectively are for spelling patterns.

Figure 15:
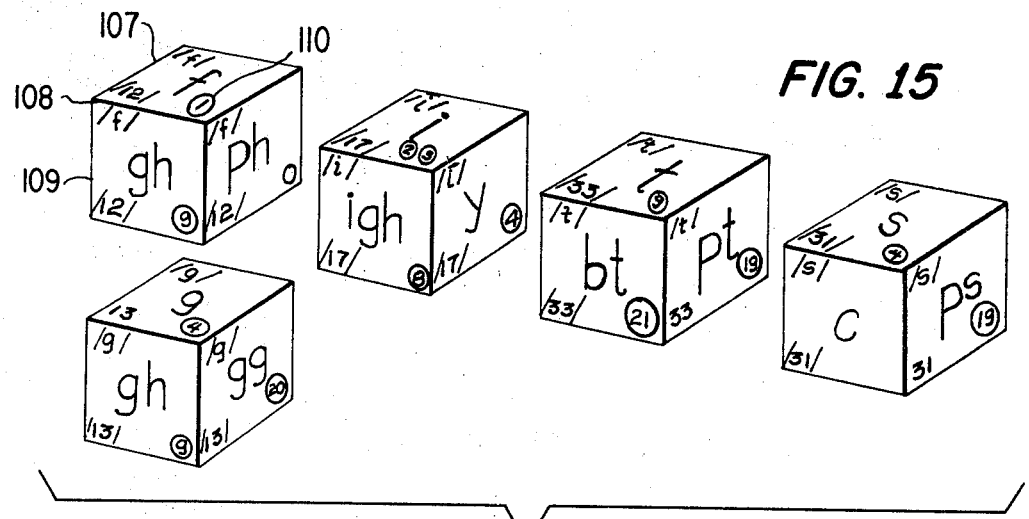

FIG. 15 discloses a series of phonetic units bearing indicia (107) representing the sound of the grapheme (letter). Indicia (108) are for discriminating one phonetic unit from another phonetic unit. Indicia (109) represent the spellings (graphemes) of a phoneme. Indicia (110) cross-reference the phonemic element and the phonogram element.

From the drawings, observation can be made showing that the same sound can be represented by many spellings and the same spelling can represent many sounds. The 26 letters of the alphabet are arranged in 136 ways to spell the 45 sounds of the language. There are 259 different ways to recognize the correct sound and spelling of the sounds of the language. As evidenced by the exposed faces in the first 3 units of FIG. 15, there are shown 27 different ways of the 240 to spell "fight" phonetically.

Figure 15A:
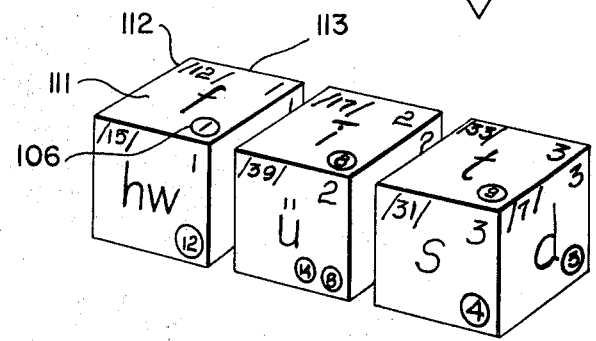

FIG. 15A shows a series of units bearing indicia of the International Phonetic alphabet with diacrytical markings as found in dictionaries. (111). Indicia 112 cross-references with the phonetic units (108) and (109) in FIG. 15 and (105) in FIG. 14. Observation can be made that it would be possible to locate any word in the dictionary if the spelling were unknown, by utilization of the elements in 15 A and cross-referencing all possible spellings of the sounds with the elements of FIG. 15. Indicia (113) are for discriminating one unit of the diacrytical element from another unit of the same element. Indicia (106) cross-references with the phonogram element in FIG. 14.

Figure 16:
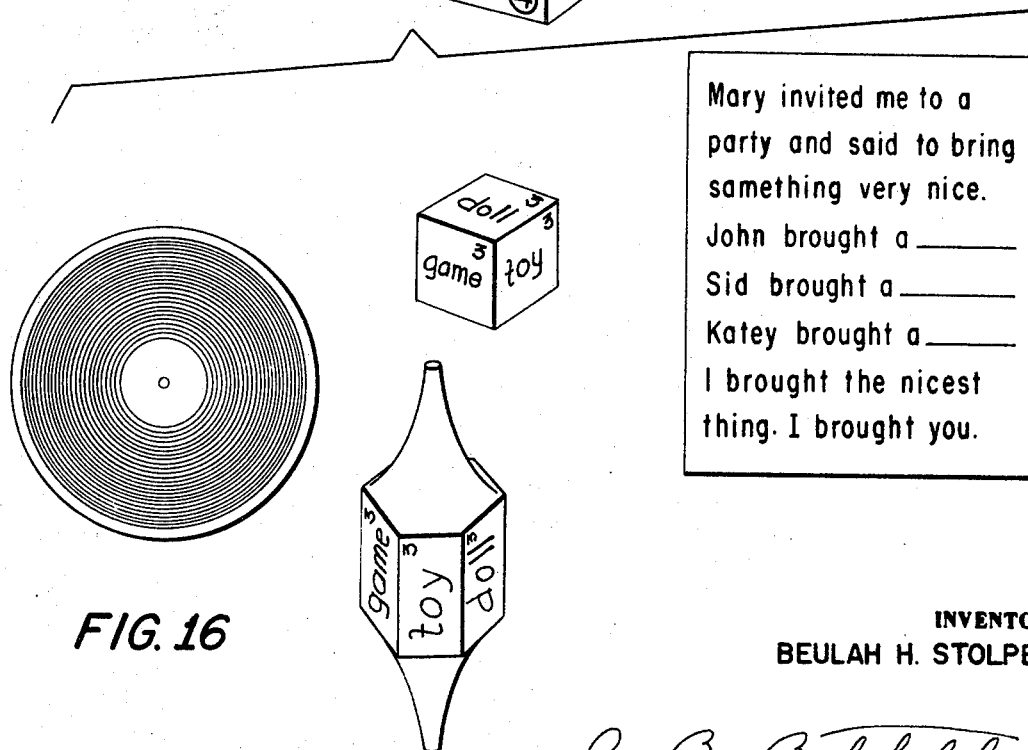

In FIG. 16 there is a schematically depicted form of the invention wherein an audio device such as a record or tape, etc., is correlated with the random choice units. The audio device relates the story and a user follows a story on the printed sheet, if desired. When the voice or reproduction pauses, the user randomly casts one of the structural multi-facted units or other structured chance element and fills in the missing word or letter on the sheet as the case may be or in the user's mind, as a completion of the recording.

In FIG. 17 which shows an audio reproduction unit, a structural unit and a sheet similar in concept to FIG. 16, the user follows a story in a similar manner. When the recording pauses, the user fills in the answer by randomly selecting a response. This form of the invention is dieally suited for playing a game utilizing an audio unit.

The concept shown in FIG. 18 depicts in the equation form similar to FIG. 5, the use of inflections as indicated on the drawings with appropriate cross-indexing. The invention contemplates utilization of a multi-faceted unit containing a plurality of form classes on a single unit or a single form class and provision is made for the reaction of bound morphemes upon the unit that can alter the form class.

FIG. 19 shows in equation form the use of derivatives. While specific examples of the present invention have been indicated in the drawing and here and above, obviously changes within the underlying theory and principles can be made. The free morpheme elements can show on one or a plurality of sides of a unit.

The basic sentence pattern unit must carry specific indicia on every one of its surfaces such as:

Unit 1 — a noun, pronoun (See FIG. 1);

Unit 2 — a verb, and a designation for "to be"; and

Unit 3 — selectively, a noun, an adverb and an adjective.

The phonogram units can be structured with a letter or a combination of letters patterned to word parts, arbitrarily but selectively representing sounds or sound combinations in the beginning, middle or ending spelling combinations. The phoneme units must be structured by grouping different spellings of a phoneme together on varying surfaces of the same unit. The phonemic marking units must contain representations, at least once in a structured element, of the 259 graphemes, coordinated according to the sounds they represent, on one or a plurality of surfaces.

The phonetic marking units must contain representations, at least once in a structured element, of the 45 sounds that make up words. They can be arbitrarily structured on the units on one or a plurality of surfaces. (Manipulation of the phonetic element or of the phonogram element graphically elucidates the concept that a "change of phoneme is a change of morpheme"....ex: log — fog — fig — fit — fat etc....)

It is also contemplated that the inter-relations and cross-referencing and method and system as employed in this invention can be incorporated in a book, film, etc., and the underlying theory is not limited to a multi-faceted unit.

Cross-referencing is shown by numerical designations in the drawings. However, appropriate indicia such as alphabetical, color, geometrical configuration or facial coding positionment, or combinations thereof, could be used for the interrelationship without departing from the spirit of the invention.

In the embodiments of, for example, FIGS. 18 and 19, as also others, one or more of the units can be random cast and the others suitably chosen for selective game or teaching solutions, or the reverse procedure can be followed, i.e., switching the problem with different end functions.

FIG. 4A shows a series of units bearing morphemes in French. Different language sets would bear designations (or characteristics) to distinguish one language (set) from another. (Different colors of the multi-faceted units has been employed here.) (102) cross-references with unit 11 in FIG. 4. (102A) cross-references with the specific surface of the corresponding unit. It will be apparent from the drawings that *my* in English is represented by the masculine and feminine in French and that the noun must also match gender as evidenced by the positioning of the noun on the unit.

It will become readily apparent that in French (for example), as shown in the drawings, nouns and adjectives have genders that must agree. The fact that most (not all) adjectives in French follow, instead of precede, the noun is a concept more easily reinforced by manipulating and repositioning the multi-faceted units. Vocabularies and concepts are expanded and reinforced by utilizing the units and by the self-checking features presented in the cross-referencing. The principle of cross-referencing the similarities and differences of different languages also applies to their phonemic and graphemic structure. These cross-references would elucidate the variations in the sounds of a spelling, and the spelling of a sound, between one language and another. The International Phonetic Alphabet would show little variation except for the addition of phonemes and graphemes that appear in one language but not in another.

Linguistics, comparatively new in its recognition as a science, is just beginning to be utilized in the teaching of reading, English as a second language, and foreign languages. Analysis of the structural components of language on manipulable, structured, multi-faceted elements provides the user with an extra dimension to absorb insights into the structure of language. Deductions can be made in one's own language, and comparisons can be drawn as to the similarities and differences inherent in the structure of the sounds, spelling and syntax of other languages. Even quite young children are able to deduce many sophisticated linguistic concepts as they play with the elements of the invention.

The foregoing description when taken with the drawings clearly illustrates the principles and specifics of the present invention as also the mode of use, the analysis of which is applicable to the linguistic structure of any language by merely adjusting the rules applicable to the structure of the language under consideration. Different ramifications and minor changes and variations will be obvious from the present disclosure without departing from the spirit and the scope of the invention as defined in and limited solely by the appended claims.

I claim:

1. Apparatus for instruction and teaching the system of language, its sound and structure, comprising:
    a. a first set of structural units, each unit bearing syntactical symbol indicia representing at least one particular part of speech and cross-reference indicia indicating the particular part of speech and class thereof; and
    b. a second set of structural units, each unit bearing indicia representing at least one phoneme and cross-reference indicia indicating the particular part and class of speech of the represented phoneme;
    c. the cross-reference indicia on said first and second sets being alike for the same part and class of speech;
    d. whereby when selected units of said first set are arranged in a sentence pattern, then selected units of said second set may be arranged in the same sentence pattern by selecting those units having cross-reference indicia which correspond to the cross-reference indicia on said selected units of said first set.

2. Apparatus as claimed in claim 1, said indicia being respectively representative of a pattern element comprising functional labels of the parts of speech, a morpheme element comprising semantic and syntactic factors of the language, a phonogram element comprising letters and combinations of letters, a phonemic alphabet and corresponding graphemes, a phonetic element and corresponding diacritical designations, each element being cross-referenced and interrelated to at least one of other element.

3. Apparatus as claimed in claim 2, said units comprising multi-faceted three dimensional structural units, respective faces thereof bearing said indicia, said units being manipulative for predetermined or random selection of presentation of the structured linguistic component represented by indicia thereof.

4. Apparatus as claimed in claim 3, said morphemes including bound and free species of the bound morpheme wherein the action of the bound morpheme on the free morpheme could change the free morpheme in number, tense or form class.

5. Apparatus as claimed in claim 3, wherein by cross-referencing and interrelating multi-faceted units bearing morphemic equivalents, the symbology presents semantic significance and understandable concept for other situational applications.

6. Apparatus as claimed in claim 3, wherein said units bear indicia in the nature of grammatical symbols constituting collectively a sentence pattern unit.

7. Apparatus as claimed in claim 3, wherein said units bear indicia in the nature of sound symbols constituting collectively a word pattern.

8. Apparatus as claimed in claim 3, wherein said indicia on one unit respectively include N, for noun; P, for pronoun; another unit containing V, for verb; and be, for "to be"; and a third unit containing N, A, for adjective, and $A/_2$, for adverb, appropriate placement of the units producing basic patterns from which all sentences are generated.

9. Apparatus as claimed in claim 3, wherein said indicia on one unit respectively include N, for noun; P, for pronoun; another unit containing V, for verb; and be, for "to be"; and a third unit containing N, A, for adjective, and A/, for adverb, whereby random casting would always produce a basic sentence pattern, of the units producing basic patterns from which all sentences are generated.

10. Apparatus as claimed in claim 3, and further including cross-referenced structured work, game or exercise sheets, audio and other devices for presentation of and solution of presented or suggestive exercises.

11. Apparatus as claimed in claim 10, said structured sheets being crossrreferenced selectively to morphemes and graphemes.

12. Apparatus as claimed in claim 3, wherein the multi-faceted units contain on the same surface the phoneme representing the sound and the grapheme representing one spelling of that sound, and contain on the surfaces of the same unit other graphemes that also represent that phoneme.

13. Apparatus as claimed in claim 3, wherein the cross-referencing includes ones for the various spellings of various different phonemes and various sounds of the same grapheme.

14. Apparatus as claimed in claim 3, said indicia relating to a non-English language species wherein compatability with the linguistic structure of that language is incorporated.

* * * * *